(12) United States Patent
Nelson et al.

(10) Patent No.: US 9,501,112 B2
(45) Date of Patent: Nov. 22, 2016

(54) THERMAL ENERGY STORAGE, DISSIPATION AND EMI SUPPRESSION FOR INTEGRATED CIRCUITS USING POROUS GRAPHITE SHEETS AND PHASE CHANGE MATERIAL

(71) Applicant: Intel Corporation, Santa Clara, CA (US)

(72) Inventors: Daryl Nelson, Beaverton, OR (US); Kevin Daniel, Tigard, OR (US); Daniel Chiang, Portland, OR (US); Mark Gallina, Hillsboro, OR (US); Steven Lofland, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/125,654

(22) PCT Filed: Aug. 10, 2013

(86) PCT No.: PCT/US2013/000186
§ 371 (c)(1),
(2) Date: Dec. 12, 2013

(87) PCT Pub. No.: WO2015/023246
PCT Pub. Date: Feb. 19, 2015

(65) Prior Publication Data
US 2015/0043161 A1 Feb. 12, 2015

(51) Int. Cl.
*G06F 1/20* (2006.01)

(52) U.S. Cl.
CPC ............... *G06F 1/206* (2013.01); *G06F 1/203* (2013.01); *G06F 2200/201* (2013.01)

(58) Field of Classification Search
CPC ..................... G06F 1/203; G06F 1/206; H05K 7/20381
USPC ............................ 361/679.54, 814, 816, 818
See application file for complete search history.

(56) References Cited

U.S. PATENT DOCUMENTS

| | | | |
|---|---|---|---|
| 6,037,032 A * | 3/2000 | Klett | B32B 5/18 156/245 |
| 6,392,883 B1 * | 5/2002 | Ali | G06F 1/203 165/185 |
| 6,867,781 B1 | 3/2005 | Van Hook et al. | |

(Continued)

OTHER PUBLICATIONS

International Search Report and Written Opinion received for PCT Patent Application No. PCT/US2013/00186, mailed on May 13, 2014, 12 pages.

(Continued)

*Primary Examiner* — Tuan T Dinh
*Assistant Examiner* — Mukund G Patel
(74) *Attorney, Agent, or Firm* — Jordan IP Law, LLC

(57) ABSTRACT

Mobile platforms and methods may provide for an integrated circuit such as a system on chip (SoC), a first heat spreader thermally coupled to the integrated circuit and a phase change material configuration thermally coupled to the first heat spreader. The integrated circuit may include logic to operate the integrated circuit in a performance burst mode according to a duty cycle, wherein the performance burst mode causes a phase change material to enter a liquid state within a graphite matrix of the phase change material configuration.

10 Claims, 8 Drawing Sheets

(56) References Cited

U.S. PATENT DOCUMENTS

| | | | | |
|---|---|---|---|---|
| 6,959,753 | B1* | 11/2005 | Weber | F28D 20/02 |
| | | | | 165/10 |
| 7,623,360 | B2* | 11/2009 | English | H05K 9/0032 |
| | | | | 361/800 |
| 2003/0205368 | A1 | 11/2003 | Chiu | |
| 2007/0254137 | A1 | 11/2007 | Koppe et al. | |
| 2010/0129648 | A1 | 5/2010 | Xu et al. | |
| 2012/0061135 | A1 | 3/2012 | Hill et al. | |
| 2012/0331321 | A1 | 12/2012 | Kaburlasos et al. | |
| 2013/0186596 | A1* | 7/2013 | Rubenstein | G06F 1/206 |
| | | | | 165/104.17 |

OTHER PUBLICATIONS

Office Action and Search Report for Taiwanese Patent Application No. 103125104, mailed Oct. 2, 2015, 17 pages including 7 pages of English translation.

International Preliminary Report on Patentability for PCT Application No. PCT/US2013/000186, mailed on Feb. 25, 2016; 9 pages.

* cited by examiner

THERMAL ENERGY STORAGE, DISSIPATION AND EMI SUPPRESSION FOR INTEGRATED CIRCUITS USING POROUS GRAPHITE SHEETS AND PHASE CHANGE MATERIAL

TECHNICAL FIELD

Embodiments generally relate to thermal energy storage, dissipation and electromagnetic interference (EMI) suppression in small form factor (SFF) computing devices. More particularly, embodiments relate to the use of phase change material configurations such as porous graphite sheets or other thermally conductive materials impregnated with a phase change material (PCM) to store and dissipate thermal energy and suppress EMI in SFF computing devices.

BACKGROUND

Mobile platforms such as wireless smart phones and smart tablets may generate heat during operation, particularly when running high performance applications. The heat (e.g., thermal energy) may lead to concerns with regard to component reliability as well as external surface (e.g., "skin") ergonomic thermal limits. Because these mobile platforms are typically very thin computing systems having small form factor (SFF) enclosures, conventional thermal management solutions may prohibitively impact the limited volumetric, weight, cost and other design constraints of the platform. The thermal management challenge may be intensified by the fact that separate solutions to prevent electromagnetic interference (EMI) from platform components and minimize radio frequency interference (RFI) noise coupling between platform components may further limit the amount of available space within the platform. Indeed, certain thermal management solutions may simply rely on printed circuit boards (PCBs) of the platforms to spread heat to cooler regions of the device due to volume, weight and/or cost constraints. Such an approach may ultimately prevent conventional mobile platforms from using certain high performance and/or high power applications.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
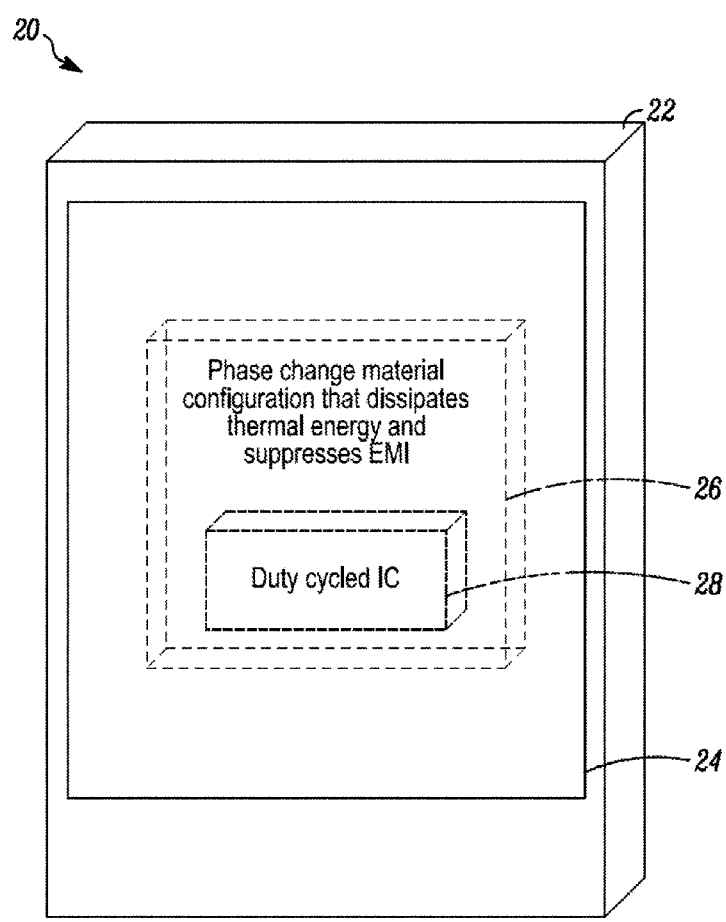
FIG. 1 is a perspective view of an example of a small form factor (SFF) mobile platform having a phase change material configuration according an embodiment.

Turning now to FIG. 1, a mobile platform 20 having a small form factor (SFF) enclosure 22 is shown. The mobile platform 20 may be a wireless smart phone, smart tablet, convertible tablet, personal digital assistant (PDA), mobile Internet device (MID), media player, "wearable", or any combination thereof, wherein the illustrated SFF enclosure 22 is relatively thin. The mobile device 20 may include a display 24 (e.g., liquid crystal display/LCD, touch screen, etc.) that facilitates interaction with and use of the mobile platform 20 by one or more users. In the illustrated example, the mobile device 20 includes an integrated circuit 28 (IC, e.g., processor, controller, chipset, system on chip/SoC) configured to execute one or more high performance and/or high power applications. Additionally, the mobile device 20 may include a phase change material configuration 26 (e.g., energy storage material) that dissipates thermal energy resulting from operation of the IC 28, or associated components and in addition can suppress/attenuate electromagnetic interference (EMI) that may radiate from the IC 28 during operation. Using a single solution to control both thermal energy and EMI may obviate volumetric, weight, cost and other design concerns with regard to the mobile platform 20.

As will be discussed in greater detail, the phase change material configuration 26 may include a graphite matrix impregnated with a phase change material (PCM) such as, for example Eicosane (38° C. melt) wax or Docosane (42° C. melt) wax. The graphite matrix may be part of one or more porous graphite sheets. In such a case, the porosity of the graphite may range from, for example, 70% to 90% and provide in-plane thermal conductivity ranging from, for example, 30 W/m K to 70 W/m K. Moreover, the porosity may be achieved via open cell cavities within the graphite sheets that contain the phase change material.

The illustrated mobile device 20 operates the integrated circuit 28 in a steady power dissipation mode or in a duty cycled performance burst mode (e.g., high frequency, voltage and/or power mode) so that heat resulting from the operation of either steady or performance burst mode may cause the phase change material to enter a liquid state within the open cell cavities of the porous graphite sheets. The phase change material may transform back into a solid state when the power from the IC 28 is reduced, or heat is otherwise conducted from the phase change material. Thus, in a dynamic approach, a burst of thermal energy may be absorbed before a junction temperature ($T_J$) limit or skin temperature ($T_{skin}$) limit are violated, and then released in-between bursts to cooler regions a using a heat spreader (e.g., thermal energy is stored and released). In a more static approach, thermal energy may be absorbed one time, and then later released as the system cools and the phase change material re-solidifies. The illustrated approach therefore enables optimization of the mobile platform 20 with regard to thermal management, EMI management, volume, weight and cost, in either a dynamic or static fashion.

Figure 2A:
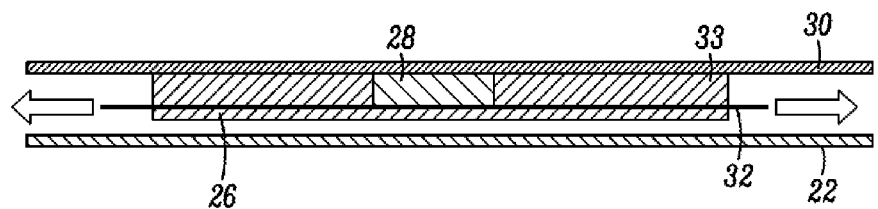
FIG. 2A is a side view of an example of a phase change material configuration in an SFF mobile platform according to an embodiment.
Figure 2B:
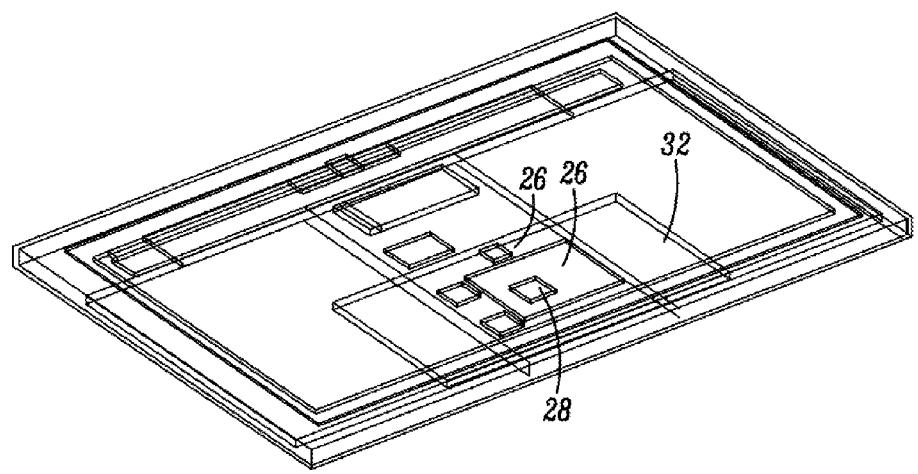
FIG. 2B is a perspective view of an example of a phase change material configuration in an SFF factor mobile platform according to an embodiment.

FIGS. 2A and 2B show the phase change material configuration 26 in a configuration in which the IC 28 is mounted to a printed circuit board (PCB) 30. In the illustrated example, a higher conductivity heat spreader 32 is thermally coupled to the IC 28 and the phase change material configuration 26 is thermally coupled to the heat spreader 32. More particularly, the heat spreader 32 may extend through the phase change material configuration 26 so that thermal energy from performance burst mode operation may first conduct throughout the heat spreader 32 (e.g., via the thermal interface between the heat spreader 32 and the IC) then to the phase change material configuration 26 above and below the heat spreader 32 (e.g., via the thermal interfaces between the heat spreader and the phase change material configuration 26). Accordingly, the illustrated heat spreader 32 and phase change material configuration 26 function as a thermal dampener to the duty cycled performance burst mode. As will be discussed in greater detail, an electrical connection 33 (e.g., shunt, jumper, via) between a ground plane of the PCB 30 and the phase change material configuration 26 may enable the phase change material configuration 26 to attenuate EMI radiation from the integrated circuit 28 due to the graphite within the phase change material configuration 26.

Figure 3:
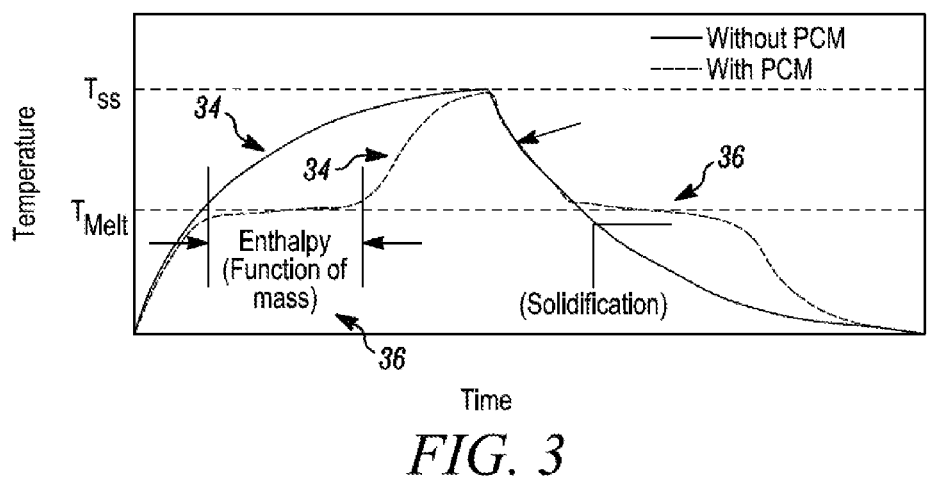
FIG. 3 is a plot of an example of a set of temperature curves for a material without phase change functionality and a material with phase change functionality according to an embodiment.

FIG. 3 shows a set of temperature curves for a material without phase change functionality and a material with phase change functionality. In general, as a material heats up, energy may be naturally stored in the mass of the material. This form of energy storage may be referred to as a simple heat phase 34 that relates to the thermal capacitance of the material. The mass of the material may store energy as it heats up until it reaches a temperature ($T_{ss}$) at which a balance is reached of storing heat internally, and convecting and radiating the heat from the material (e.g., steady state heat transfer). Adding mass with high specific heat (Cp) materials may increase the thermal energy storage capability of a platform, but such an approach may not be practical for weight sensitive SFF mobile platforms. If, however, a phase change material is used, an additional form of energy storage may be obtained in the form of latent heat, which may occur during a latent heat phase 36. During the latent heat phase 36, thermal energy may flow into the material to change it from one phase to another, such as from a solid to a liquid, while the temperature ($T_{melt}$) remains relatively constant during the transition. The effective mass of the material as a result of the phase change may therefore be approximately 50×, for example.

Figure 4A:
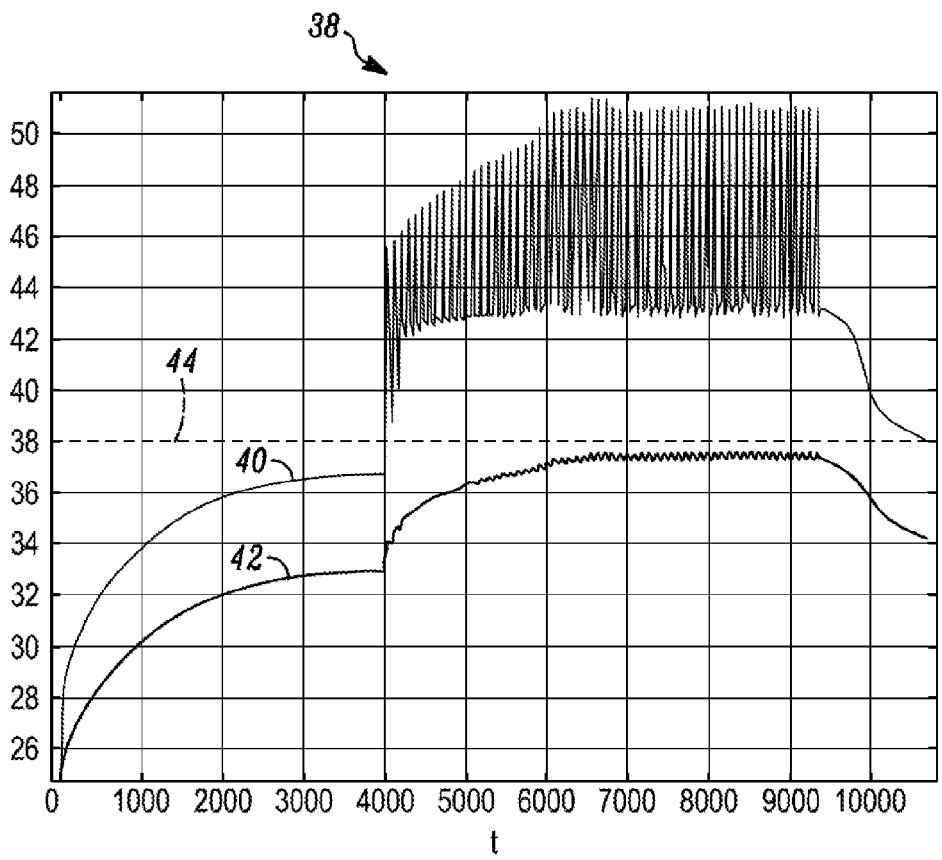
FIG. 4A is a plot of an example of a set of temperature curves for a duty cycled mobile platform according to an embodiment.

FIG. 4A shows a plot 38 of an IC temperature curve 40 and a skin temperature curve 42 for a mobile platform having a performance burst duty cycled IC and a phase change material configuration that dissipates thermal energy. In the illustrated example, a sustained thirty second 8 W performance burst followed by a sixty second recovery time (e.g., IC operated at reduced or light load), provides a 33.3% duty cycle. By contrast, conventional solutions may have a maximum sustainable 8 W performance burst duration of one to three seconds. By monitoring the temperature of, for example, the phase change material configuration, heat spreader, IC, etc., smart thermal policies may be developed to maximize performance burst usage within thermal constraints for different applications. For example, the illustrated skin temperature curve 42 remains below a skin temperature limit 44 and the IC temperature curve 40 may remain well below a junction temperature limit (not shown, e.g., 80° C.) during operation of the IC due to the techniques described herein. Simply put, the duty cycle may prevent both the junction temperature limit and the skin temperature limit 44 from being exceeded, when combined with using a PCM to store energy and graphite to spread heat before the skin or IC temperature limits are reached.

Figure 4B:
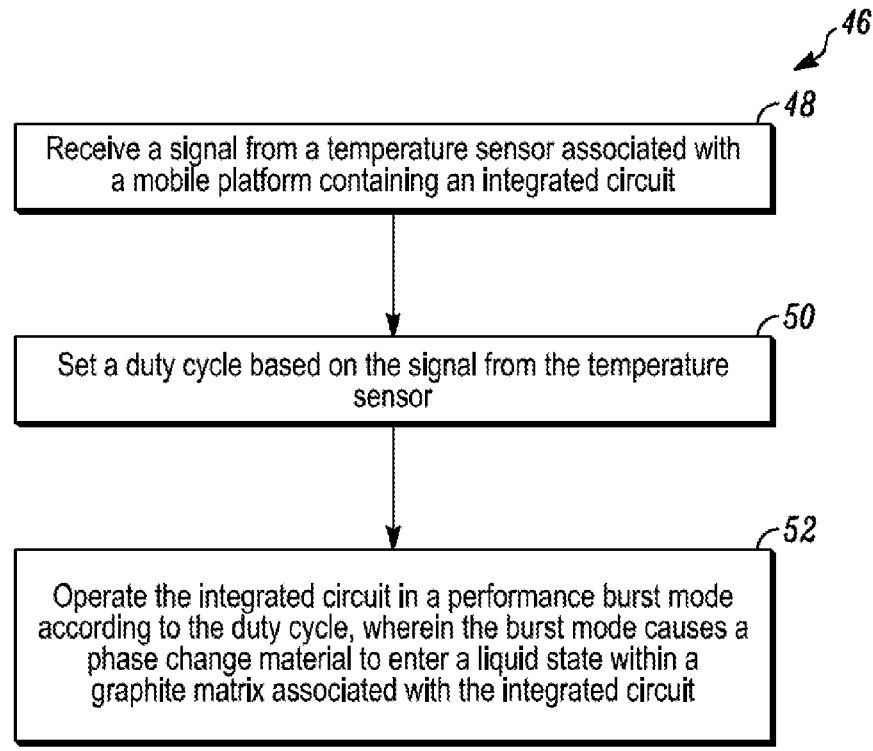
FIG. 4B is a flowchart of an example of a method of managing thermal energy storage and dissipation in a mobile platform according to an embodiment.

Turning now to FIG. 4B, a method 46 of managing thermal energy storage and dissipation in a mobile platform is shown. The method 46 may be implemented as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 46 may be written in any combination of one or more programming languages, including an object oriented programming language such as Java, Smalltalk, C++ or the like and conventional procedural programming languages, such as the "C" programming language or similar programming languages.

Illustrated block 48 provides for receiving a signal from a temperature sensor associated with a mobile platform containing an integrated circuit. As already noted, the temperature sensor may be positioned to monitor the temperature of an internal component of the mobile platform such as, for example, a phase change material configuration, heat spreader, the IC, etc., or may be used to predict skin temperatures. A duty cycle may be set at block 50 based on the signal from the temperature, wherein illustrated block 52 operates the integrated circuit in a performance burst mode according to the duty cycle. In the illustrated example, the burst mode causes a phase change material to enter a liquid state within a graphite matrix associated with the IC.

Figure 5:
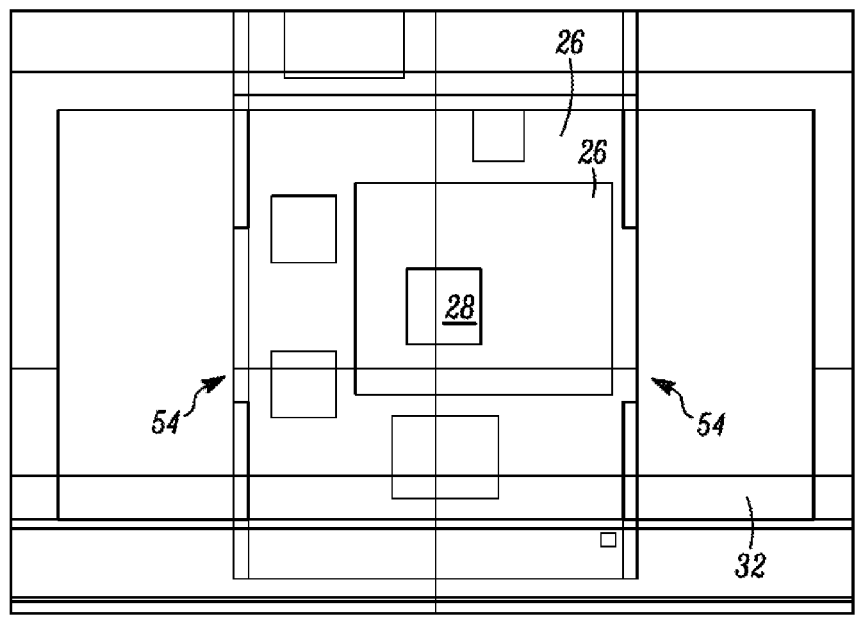
FIG. 5 is a plan view of an example of a plurality of heat reliefs according to an embodiment.

FIG. 5 demonstrates that one or more heat reliefs/cutouts 54 may be incorporated within the heat spreader 32 to control the conduction of heat away from the skin of the mobile platform. Thus, the burst cycling solution may enable the performance burst to dissipate heat into the phase change material configuration 26, wherein all of the phase change material is used to maximize absorption of the burst. Between performance bursts, energy may drain through the spreaders to the platform, enabling the cycle to repeat in a sustainable fashion.

Figure 6A:
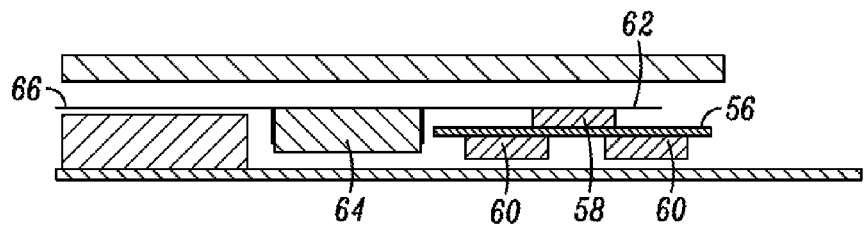
FIGS. 6A and 6B are side views of examples of phase change material configurations in SFF mobile platforms according to alternative embodiments.

FIG. 6A shows an alternative solution in which a PCB 56 having an integrated circuit 58 and other components 60 (e.g., memory) mounted thereon is positioned so that the integrated circuit 58 is thermally coupled to a first heat spreader 62 (e.g., metal foil and/or graphite spreader). The first heat spreader 62 may be in turn thermally coupled to a phase change material configuration 64 that is beside the integrated circuit 58 rather than above or beneath the integrated circuit 58. The illustrated phase change material configuration 64 is thermally coupled to a second heat spreader 66. Accordingly, the first heat spreader 62 may be used to conduct thermal energy from the integrated circuit 58 to the phase change material configuration 64 during performance bursts, and the second heat spreader 66 may be used to drain thermal energy from the phase change material configuration 64 to cooler regions of the mobile platform/chassis between performance bursts. The second heat spreader 66 may therefore provide functionality similar to that of the heat reliefs 54 (FIG. 5), already discussed. Using metal foil and/or graphite for the first heat spreader 62 may enable the first heat spreader 62 to also provide EMI and/or RFI attenuation. The illustrated solution may enable thinner mobile platforms to be constructed without concern over thermal limit violations, weight, cost, and so forth.

Figure 6B:
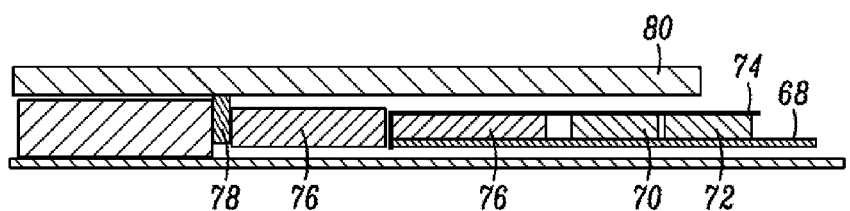

FIG. 6B shows another alternative solution in which a PCB 68 having an integrated circuit 70 and a memory component 72 mounted thereon is positioned so that the integrated circuit 70 and the memory component 72 are thermally coupled to a first heat spreader 74 (e.g., metal foil and/or graphite spreader). The first heat spreader 74 may in turn be thermally coupled to a phase change material configuration 76 that is also beside the integrated circuit 70 rather than above or beneath the integrated circuit 70. The illustrated phase change material configuration 76 is thermally coupled to a second heat spreader 78 that is an aluminum spreader associated with a display 80, wherein the second heat spreader 78 also provides stiffening support to the display 80. Again, the first heat spreader 74 may be used to conduct thermal energy from the integrated circuit 70 and the memory component 72 to the phase change material configuration 76 during performance bursts, and the second heat spreader 78 may be used to drain thermal energy from the phase change material configuration 76 to cooler regions of the mobile platform/chassis between performance bursts. Using metal foil and/or graphite for the first heat spreader 74 may also enable the first heat spreader 74 to provide EMI and/or RFI attenuation, wherein the illustrated solution may enable even thinner mobile platforms to be constructed without concern over thermal limit violations, weight, cost, and so forth.

Figure 7:
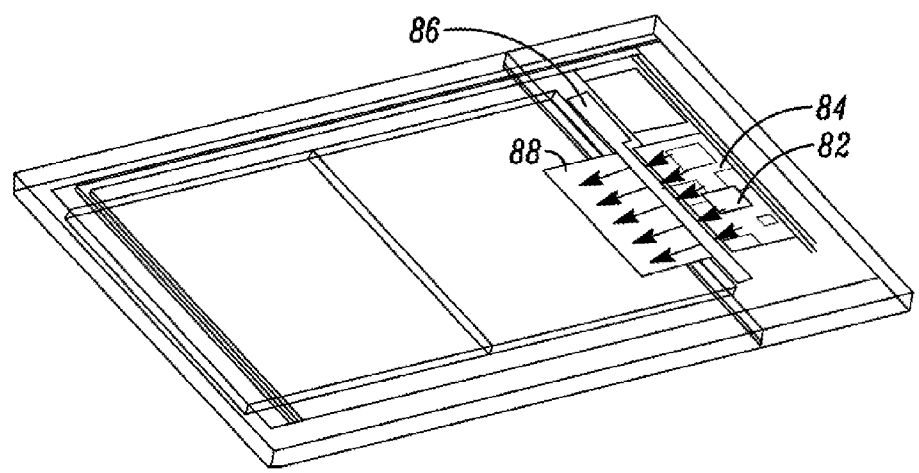
FIG. 7 is a perspective view of an example of a phase change material configuration in an SFF mobile platform according to an alternative embodiment.

FIG. 7 shows a perspective view of a solution in which an integrated circuit 82 is thermally coupled to a first heat spreader 84 (e.g., metal foil and/or graphite spreader/shield). The first heat spreader 84 may be in turn thermally coupled to a phase change material configuration 86 that is beside the integrated circuit 82 rather than above or beneath the integrated circuit 82. The illustrated phase change material configuration 86 is thermally coupled to a second heat spreader 88. Accordingly, the first heat spreader 84 may be used to conduct thermal energy from the integrated circuit 82 to the phase change material configuration 86 during performance bursts, and the second heat spreader 88 may be used to drain thermal energy from the phase change material configuration 86 to cooler regions of the mobile platform/chassis between performance bursts.

Figure 8A:
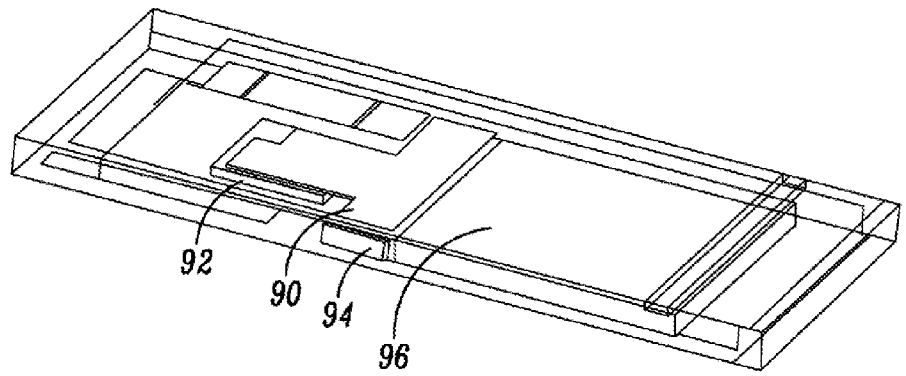
FIGS. 8A and 8B are perspective and plan views, respectively, of examples of phase change material geometric configurations according to alternative embodiments.
Figure 8B:
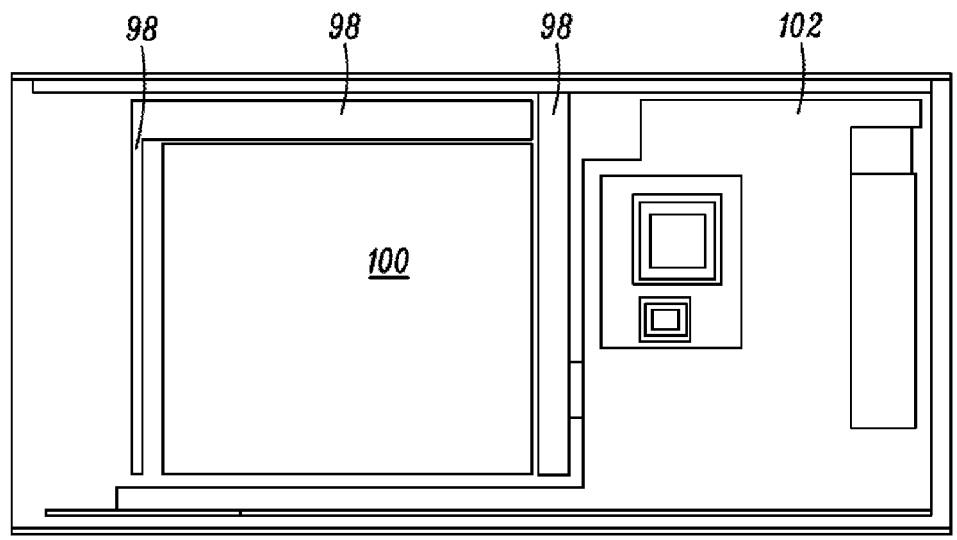

FIG. 8A shows a geometric configuration in which a heat spreader 90 is thermally coupled to an EMI "can" 92 that contains an integrated circuit (not shown). A phase change material configuration 94 may be thermally coupled to the heat spreader 90 and positioned in available space beside a battery 96 of the mobile platform in order to conserve space. Similarly, FIG. 8B shows a geometric configuration in which a phase change material configuration 98 is shaped to fill unused volume around a battery 100 and a PCB 102 of a mobile platform.

Figure 9:
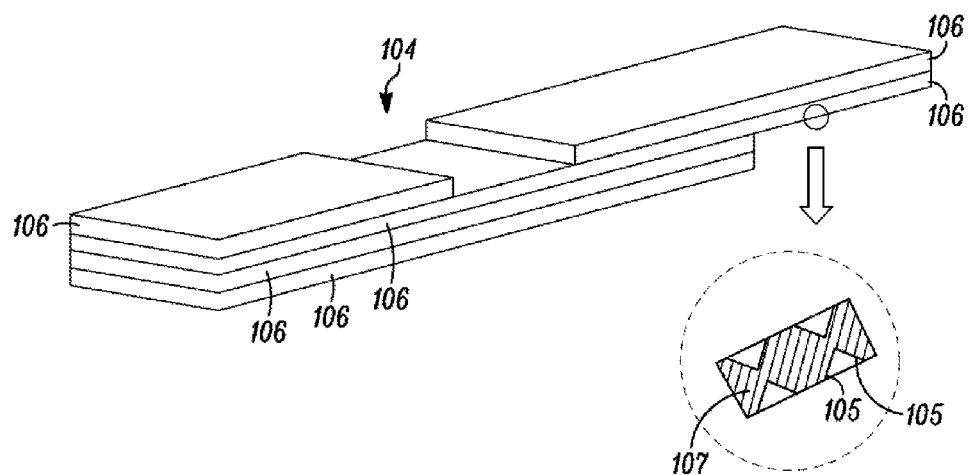
FIG. 9 is a perspective view of an example of a plurality of porous graphite sheets according to an embodiment.

In this regard, FIG. 9 demonstrates that a phase change material configuration 104 may include a plurality of porous graphite sheets 106 that may be shaped, stacked and/or coupled to one another (e.g., via adhesive layers) to form complex three-dimensional (3D) structures that do not physically interfere with other internal components (e.g., frames, wires, antennas, flex cables, etc.) of the mobile platform. In the illustrated example, each graphite sheet 106 includes a graphite matrix that defines a plurality of open cell cavities 105 containing a phase change material 107 such as wax (e.g., Eicosane, Docosane, etc.).

Figure 10A:
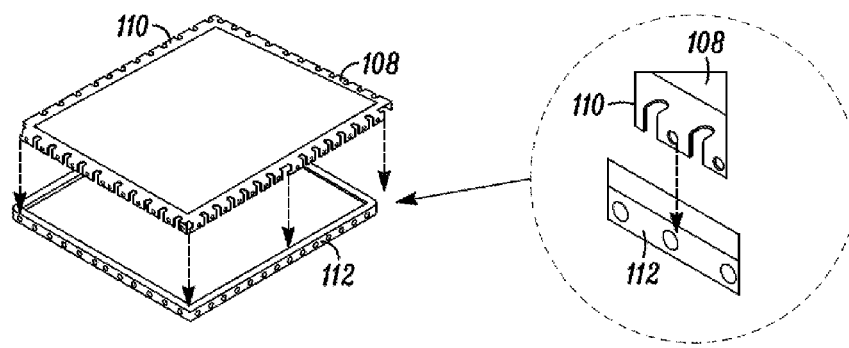
FIGS. 10A and 10B are perspective views of examples of phase change material configurations being used to suppress electromagnetic interference (EMI) according to alternative embodiments.

As already noted, the phase change material configuration may be used to attenuate EMI and/or RFI in addition to thermal management in a mobile platform. FIG. 10A shows one approach in which a top plate 108 containing a graphite matrix impregnated with a phase change material includes a frame structure 110 that may be removably coupled to an EMI fence 112. The top plate 108 and frame structure 110 may be referred to as an EMI "can". Mechanically coupling the frame structure 110 to the EMI fence 112 may enable the top plate 108 to be electrically coupled to the EMI fence 112. Thus, if the EMI fence 112 is electrically coupled (e.g., soldered, surface mounted) to a ground plane of a PCB (not shown), the graphite matrix of the top plate 108 may provide attenuation of EMI and/or RFI during operation of the integrated circuit(s) mounted on the PCB. As already noted, the phase change material of the top plate 108 may also enable tight control over thermal energy during duty cycled performance bursts. In the illustrated example, the frame structure 110 includes protrusions that mate with corresponding apertures in the EMI fence 112, although other mating solutions may also be used.

Of particular note is that the illustrated solution may be suitable for applications and/or manufacturing environments in which flexibility between high performance configurations (e.g., PCM top plate) and low performance configurations (e.g., non-PCM top plate) may be involved. The illustrated approach may also be advantageous when retrofitting, reworking, repairing and/or debugging of the mobile platform is to be conducted. Moreover, the illustrated solution may replace existing can solutions in a fashion that carries no z-height penalty for the device. Additionally, thermal coupling between the IC and the heat spreader may be achieved through an appropriate thermal interface material as may already be done with respect to heat sinks, for example.

Figure 10B:
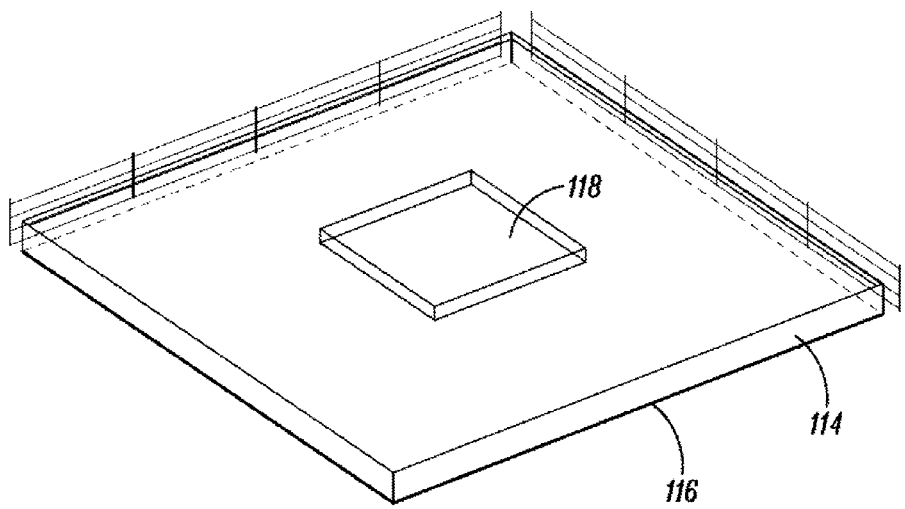

FIG. 10B shows another approach in which a phase change material configuration 114 surrounds an integrated circuit 118 and is coupled directly to a PCB via an electrically conductive epoxy 116. The illustrated approach may be less expensive than the approach of FIG. 10A, although it may be less reworkable.

Figure 11:
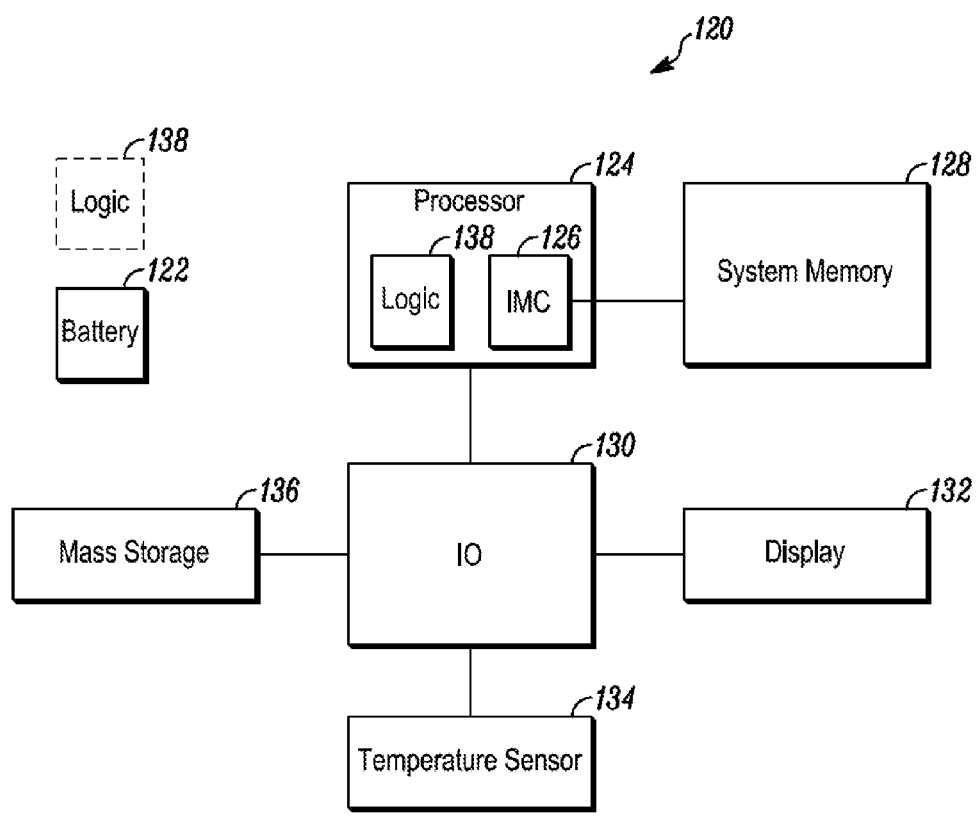
FIG. 11 is a block diagram of an example of a mobile platform according to an embodiment.

FIG. 11 shows a platform 120. The platform 120 may be part of a system having computing functionality (e.g., personal digital assistant/PDA, laptop, smart tablet, desktop, server), communications functionality (e.g., wireless smart phone), to imaging functionality, media playing functionality (e.g., smart television/TV), etc., or any combination thereof (e.g., mobile Internet device/MID). In the illustrated example, the platform 120 includes a battery 122 to supply power to the system and a processor 124 having an integrated memory controller (IMC) 126, which may communicate with system memory 128. The system memory 128 may include, for example, dynamic random access memory (DRAM) configured as one or more memory modules such as, for example, dual inline memory modules (DIMMs), small outline DIMMs (SODIMMs), etc.

The illustrated platform 120 also includes a input output (IO) module 130, sometimes referred to as a Southbridge of a chipset, that functions as a host device and may communicate with, for example, a display 132, a temperature sensor 134 and mass storage 136 (e.g., hard disk drive/HDD, optical disk, flash memory, etc.). The illustrated processor 124 may execute logic 138 that is configured to operate the processor 124 in a performance burst mode (e.g., increased frequency, voltage and/or power) according to a duty cycle, wherein the performance burst mode causes a phase change material such as, for example, the phase change material 107 (FIG. 9) to enter a liquid state within a plurality of open cell cavities such as, for example, the cavities 105 (FIG. 9). The duty cycle may be set so that the duty cycle, phase change material and graphite matrix combine to prevent a junction temperature associated with the processor 124 and a skin temperature limit associated with the platform 120 from being exceeded. In the case of a fixed platform such as a desktop or server, the duty cycle, PCM and graphite matrix may only prevent the junction temperature from being exceeded. In one example, the duty cycle is set based on a signal from the temperature sensor 134. Additionally, the processor 124 and the IO module 130 may be implemented together on the same semiconductor die as a system on chip (SoC).

ADDITIONAL NOTES AND EXAMPLES

Example 1 may include an apparatus to manage integrated circuit performance, comprising logic, implemented at least partly in fixed functionality hardware, to operate an integrated circuit in a performance burst mode according to a duty cycle, wherein the performance burst mode is to cause a phase change material to enter a liquid state within a graphite matrix associated with the integrated circuit.

Example 2 may include the apparatus of Example 1, wherein the duty cycle operation, the phase change material and the graphite matrix combine to prevent a junction temperature limit associated with the integrated circuit from being exceeded.

Example 3 may include the apparatus of Example 1, wherein the duty cycle operation, the phase change material and the graphite matrix combine to prevent a skin temperature limit associated with a mobile platform containing the integrated circuit from being exceeded.

Example 4 may include the apparatus of any one of Examples 1 to 3, wherein the logic is to set the duty cycle based on a signal from a temperature sensor associated with a mobile platform containing the integrated circuit.

Example 5 may include a system to manage integrated circuit performance, comprising an integrated circuit, a first heat spreader thermally coupled to the integrated circuit and a phase change material configuration thermally coupled to the first heat spreader.

Example 6 may include the mobile platform of Example 5, wherein the phase change material configuration includes a graphite matrix impregnated with a phase change material.

Example 7 may include the mobile platform of Example 6, wherein the phase change material includes wax.

Example 8 may include the mobile platform of Example 6, wherein the phase change material is to be contained within the graphite matrix when the phase change material is in a liquid state.

Example 9 may include the mobile platform of Example 5, wherein the integrated circuit includes logic to operate the integrated circuit in a performance burst mode according to a duty cycle.

Example 10 may include the mobile platform of Example 9, wherein the duty cycle operation, the phase change material and the graphite matrix are to combine to prevent a junction temperature limit associated with the integrated circuit from being exceeded.

Example 11 may include the mobile platform of Example 9, wherein the duty cycle operation, the phase change material and the graphite matrix are to combine to prevent a skin temperature limit associated with the mobile platform from being exceeded.

Example 12 may include the mobile platform of Example 9, further including a temperature sensor, wherein the logic is to set the duty cycle based on a signal from the temperature sensor.

Example 13 may include the mobile platform of Example 5, wherein the first heat spreader includes one or more heat reliefs to conduct heat away from a skin of the mobile platform.

Example 14 may include the mobile platform of Example 5, further including a second heat spreader thermally coupled to the phase change material configuration.

Example 15 may include the mobile platform of Example 14, further including a display, wherein the second heat spreader is an aluminum spreader associated with the display.

Example 16 may include the mobile platform of any one of Examples 5 to 15, further including a printed circuit board having a ground plane electrically coupled to the integrated circuit, wherein the phase change material configuration is electrically coupled to the ground plane to attenuate electromagnetic interference (EMI) radiation.

Example 17 may include the mobile platform of Example 16, further including an EMI fence electrically coupled to the ground plane and the phase change material configuration.

Example 18 may include the mobile platform of Example 17, wherein the phase change material configuration is removably coupled to the EMI fence.

Example 19 may include the mobile platform of claim 16, further including an epoxy disposed between the printed circuit board and the phase change material configuration.

Example 20 may include a method of managing integrated circuit performance, comprising operating an integrated circuit in a performance burst mode according to a duty cycle, wherein the performance burst mode causes a phase change material to enter a liquid state within a graphite matrix associated with the integrated circuit.

Example 21 may include the method of Example 20, wherein the duty cycle operation, the phase change material and the graphite matrix combine to prevent a junction temperature limit associated with the integrated circuit from being exceeded.

Example 22 may include the method of Example 20, wherein the duty cycle operation, the phase change material and the graphite matrix combine to prevent a skin temperature limit associated with a mobile platform containing the integrated circuit from being exceeded.

Example 23 may include the method of any one of Examples 20 to 22, further including setting the duty cycle based on a signal from a temperature sensor associated with a mobile platform containing the integrated circuit.

Example 24 may include an apparatus to manage integrated circuit performance, comprising means for performing the method of any one of Examples 20 to 23.

Thus, techniques described herein may involve using an energy storage material such as a phase change material configuration as an EMI shield as well as a mechanism to absorb performance bursts and then dissipate heat through additional heat spreaders to cooler regions of an SFF mobile platform. The performance bursts may be timed in such a way that each burst is spread into the energy storage material, where the energy storage material changes phase. The burst may then be stopped to allow a cooling period during which energy drains through additional heat spreaders. The cooling period may cause the energy storage material to re-solidify and be ready for subsequent bursts. As a result, a sustainable performance burst cooling duty cycle may be obtained without violating IC/SoC reliability or ergonomic skin temperature limits. Moreover, EMI and RFI shielding may be obtained via the same energy storage material.

Techniques described herein may therefore enable high performance applications such as gaming applications to be executed on very thin and lightweight mobile platforms for extended periods of time without experiencing performance degradations such as glitches, pauses in video streaming, pauses in uploading, slow performance, and so forth. Moreover, such advantages may be obtained without concern over volumetric, weight, cost and other design constraints.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/ or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A mobile platform comprising:
an integrated circuit;
a first heat spreader thermally coupled to the integrated circuit; and
a phase change material configuration thermally coupled to the first heat spreader, wherein the phase change material is impregnated within open cell cavities of porous graphite sheets;
a printed circuit board having a ground plane electrically coupled to the integrated circuit, wherein the phase change material configuration is electrically coupled to the printed circuit ground plane to attenuate electromagnetic interference (EMI) radiation, further including an epoxy disposed between the printed circuit board and the phase change material configuration;
an EMI fence electrically coupled to the ground plane and the phase change material configuration wherein the phase change material configuration is removably coupled to the EMI fence.

2. The mobile platform of claim 1, wherein the phase change material includes wax.

3. The mobile platform of claim 1, wherein the phase change material is to be contained within the graphite matrix when the phase change material is in a liquid state.

4. The mobile platform of claim 1, wherein the integrated circuit includes logic to operate the integrated circuit in a performance burst mode according to a duty cycle.

5. The mobile platform of claim 4, wherein the duty cycle operation, the phase change material and the graphite matrix are to combine to prevent a junction temperature limit associated with the integrated circuit from being exceeded.

6. The mobile platform of claim 4, wherein the duty cycle operation, the phase change material and the graphite matrix are to combine to prevent a skin temperature limit associated with the mobile platform from being exceeded.

7. The mobile platform of claim 4, further including a temperature sensor, wherein the logic is to set the duty cycle based on a signal from the temperature sensor.

8. The mobile platform of claim 1, wherein the first heat spreader includes one or more heat reliefs to conduct heat away from a skin of the mobile platform.

9. The mobile platform of claim 1, further including a second heat spreader thermally coupled to the phase change material configuration.

10. The mobile platform of claim 9, further including a display, wherein the second heat spreader is an aluminum spreader associated with the display.

* * * * *